(12) United States Patent
Weng et al.

(10) Patent No.: US 10,761,653 B2
(45) Date of Patent: Sep. 1, 2020

(54) TOUCH DISPLAY PANEL AND METHOD FOR DRIVING TOUCH DISPLAY PANEL

(71) Applicant: HON HAI PRECISION INDUSTRY CO., LTD., New Taipei (TW)

(72) Inventors: Yu-Fu Weng, New Taipei (TW); Chien-Wen Lin, New Taipei (TW); Chia-Lin Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/568,899

(22) Filed: Sep. 12, 2019

(65) Prior Publication Data

US 2020/0183563 A1 Jun. 11, 2020

(30) Foreign Application Priority Data

Dec. 6, 2018 (CN) .......................... 2018 1 1487813

(51) Int. Cl.
| | | |
|---|---|---|
| *G06F 3/045* | (2006.01) | |
| *G06F 3/041* | (2006.01) | |
| *G06F 3/044* | (2006.01) | |
| *G09G 3/20* | (2006.01) | |
| *G06K 9/00* | (2006.01) | |

(52) U.S. Cl.
CPC ........ *G06F 3/04166* (2019.05); *G06F 3/0412* (2013.01); *G06F 3/0446* (2019.05); *G06K 9/0002* (2013.01); *G09G 3/20* (2013.01)

(58) Field of Classification Search
CPC .. G06F 3/0412; G06F 3/04166; G06F 3/0446; G06K 9/0002; G09G 3/20
See application file for complete search history.

(56) References Cited

U.S. PATENT DOCUMENTS

| | | | |
|---|---|---|---|
| 2016/0098140 A1 | 4/2016 | Lee et al. | |
| 2017/0371213 A1* | 12/2017 | Wang | ..................... G02F 1/1362 |
| 2018/0150163 A1* | 5/2018 | Lee | ........................ G06F 3/0412 |
| 2018/0173923 A1 | 6/2018 | Lee et al. | |

FOREIGN PATENT DOCUMENTS

| | | |
|---|---|---|
| CN | 108206013 A | 6/2018 |
| TW | 201614441 A | 4/2016 |

\* cited by examiner

*Primary Examiner* — Insa Sadio
(74) *Attorney, Agent, or Firm* — ScienBiziP, P.C.

(57) ABSTRACT

A display panel able to receive full fingerprint impressions in a display area together with command touches, in addition to showing images, includes a substrate, scan lines, data lines, touch scan lines, touch lines, sub-pixels, and fingerprint sensing units. A method for driving such multifunctional touch display panel is also provided.

18 Claims, 11 Drawing Sheets

TOUCH DISPLAY PANEL AND METHOD FOR DRIVING TOUCH DISPLAY PANEL

FIELD

The subject matter herein generally relates to touch displays, in particular to a touch display panel having a fingerprint identification function and a driving method of the touch display panel.

BACKGROUND

Touch display panels are widely used in various display devices, such as tablet computers and information inquiry machines in public halls. A display device generally defines a display area and a non-display area. Conventional display devices cannot take and recognize a fingerprint in the display area.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

Figure 1:
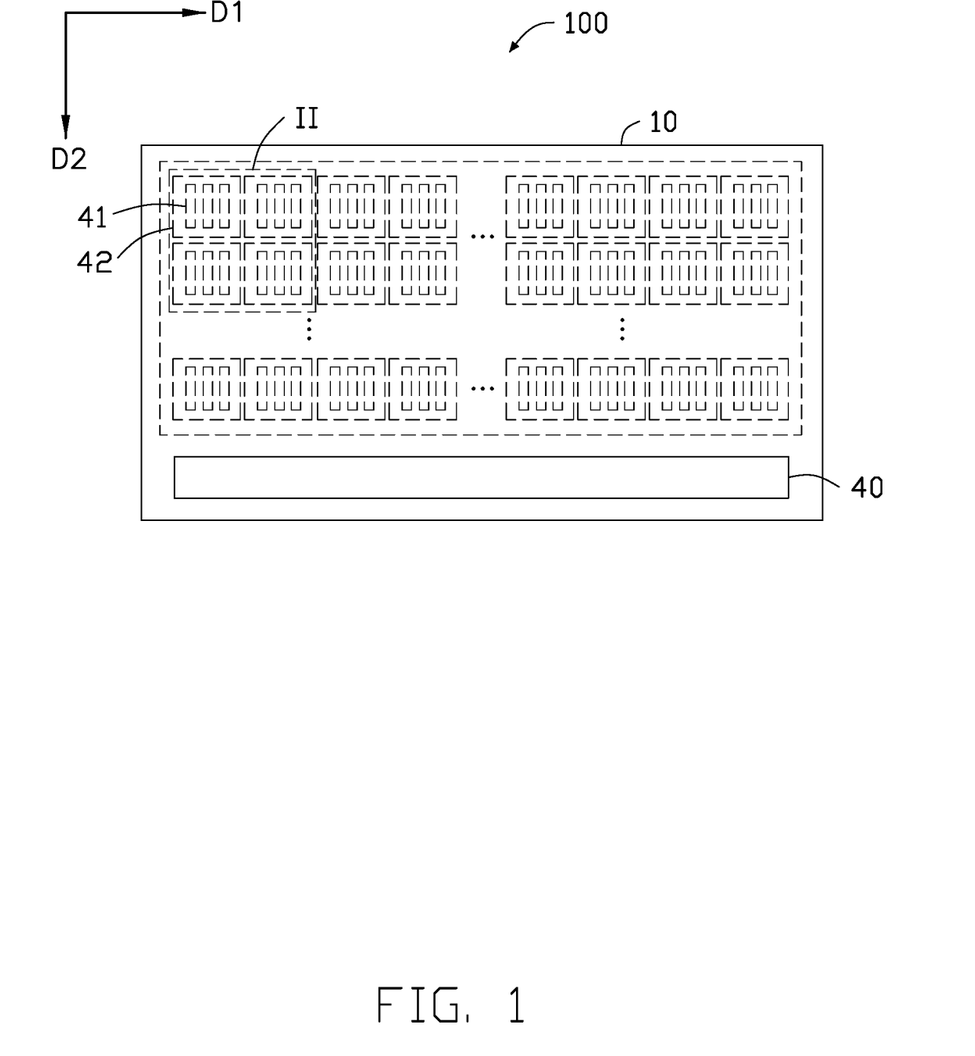
FIG. 1 is a planar view showing a touch display panel according to an embodiment.

As shown in FIG. 1, a touch display panel 100 includes a substrate 10 and a plurality of sub-pixels 41 defined on the substrate 10. The sub-pixels 41 are arranged in a matrix. Three adjacent sub-pixels 41 in the first direction D1 shown in FIG. 1 define one pixel 42. In other embodiments, one pixel 42 may include more than three adjacent sub-pixels 41.

Figure 2:
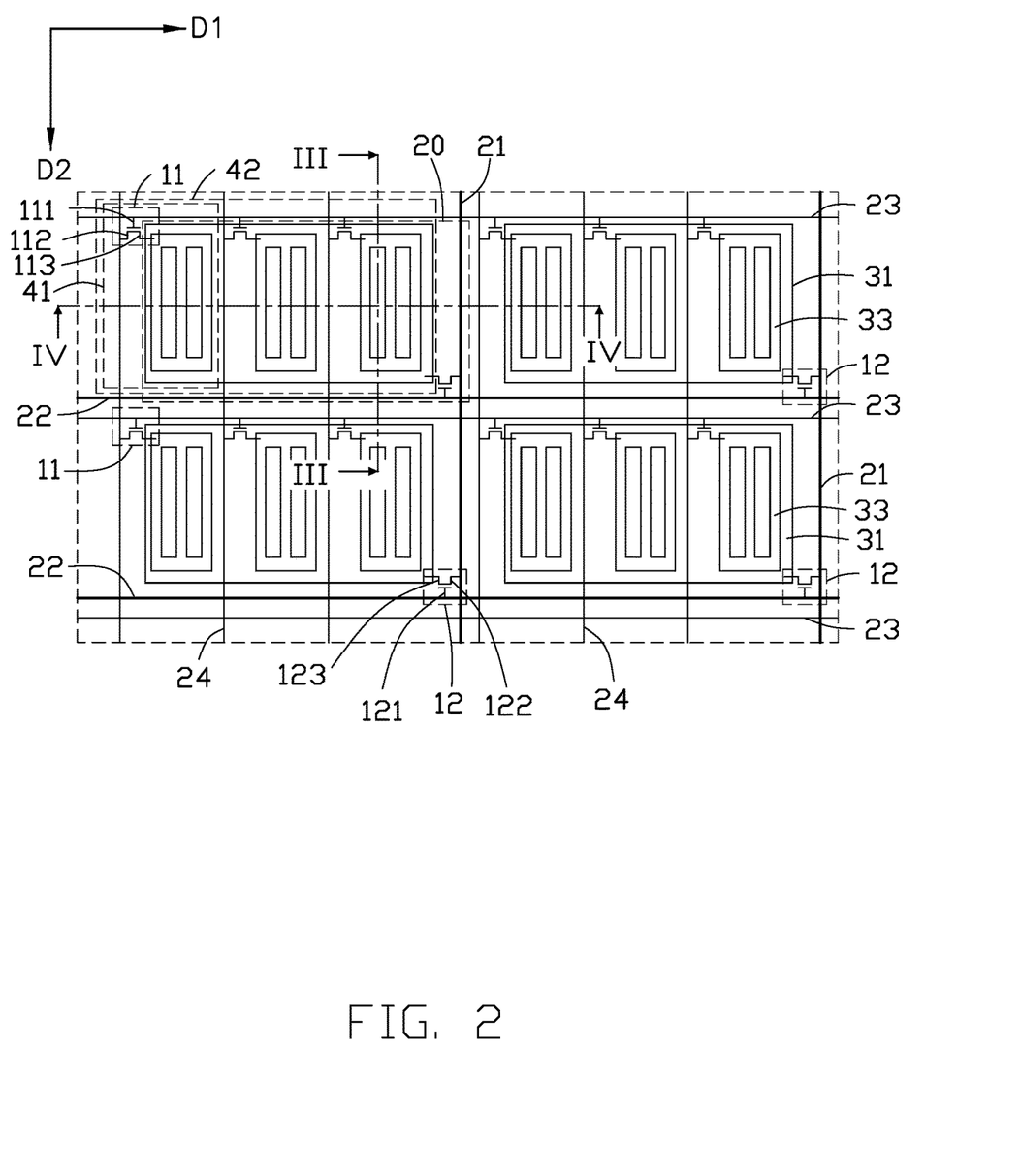
FIG. 2 is an enlarged view of portion II of FIG. 1.

As shown in FIG. 2, the touch display panel 100 includes a plurality of scan lines 23 extending in the first direction D1 and a plurality of data lines 24 extending in a second direction D2 intersecting with the first direction D1. In one embodiment, the second direction D2 is perpendicular to the first direction D1. An area which is surrounded by any adjacent two scan lines 23 and any adjacent two data lines 24 defines one sub-pixel 41.

The touch display panel 100 further includes on the substrate 10 a plurality of first thin film transistors (TFTs) 11, a plurality of second TFTs 12, and a plurality of common electrodes 31.

As shown in FIG. 2, the touch display panel 100 further includes a plurality of touch scan lines 22 extending in the first direction D1, and a plurality of touch lines 21 extending in the second direction D2. An area which is surrounded by any adjacent two touch scan lines 22 and any adjacent two touch lines 21 defines one sensing unit 20.

Each touch scan line 22 and one scan line 23 are adjacent and appear in pairs. Each pair of touch scan lines 22 and scan lines 23 are arranged to correspond to one row of sub-pixels 41 (along the first direction D1). A number of scan lines 23 is equal to the number of touch scan lines 22. Each data line 24 is arranged to correspond to one column of sub-pixels 41 (along the second direction D2) and each touch line 21 is arranged to correspond to one column of pixels 42 (along the second direction D2). The number of touch lines 21 is thus less than the number of data lines 24.

The touch display panel 100 further includes a plurality of pixel electrodes 33. In one embodiment, each common electrode 31 corresponds to three adjacent sub-pixels 41 (one pixel 42), and each sub-pixel 41 includes one pixel electrode 33. That is, each common electrode 31 corresponds to three adjacent pixel electrodes 33.

As shown in FIG. 1, the touch display panel 100 further includes a driving circuit 40. The driving circuit 40 is electrically connected to the data lines 24, the touch lines 21, the touch lines 21, and the touch scan lines 22. During a display period, the driving circuit 40 applies common voltage signals to the common electrodes 31 and display signals to the pixel electrodes 33. During a touch period, the driving circuit 40 applies touch driving signals to the common electrodes 31 to sense touches. During a fingerprint sensing period, the driving circuit 40 applies a fingerprint sensing signal to the common electrode 31 to sense fingerprint.

As shown in FIG. 2, each sensing unit 20 includes one common electrode 31, and one second TFT 12. A gate electrode 121 of each second TFT 12 is electrically connected to one touch scan line 22, a source electrode 122 of each second TFT 12 is electrically connected to one touch line 21, and a drain electrode 123 of each second TFT 12 is electrically connected to one common electrode 31. In one embodiment, each common electrode 31 is substantially rectangular and a maximum side length of the rectangle is less than 100 micrometers. The sensing unit 20 is able to detect bumps and depressions on the fingerprint to realize fingerprint sensing.

In one embodiment, a gate electrode 111 of each first TFT 11 is electrically connected to one scan line 23, a source electrode 112 of each first TFT 11 is electrically connected to one data line 24, and a drain electrode 113 of each first TFT 11 is electrically connected to one pixel electrode 33.

Figure 3:
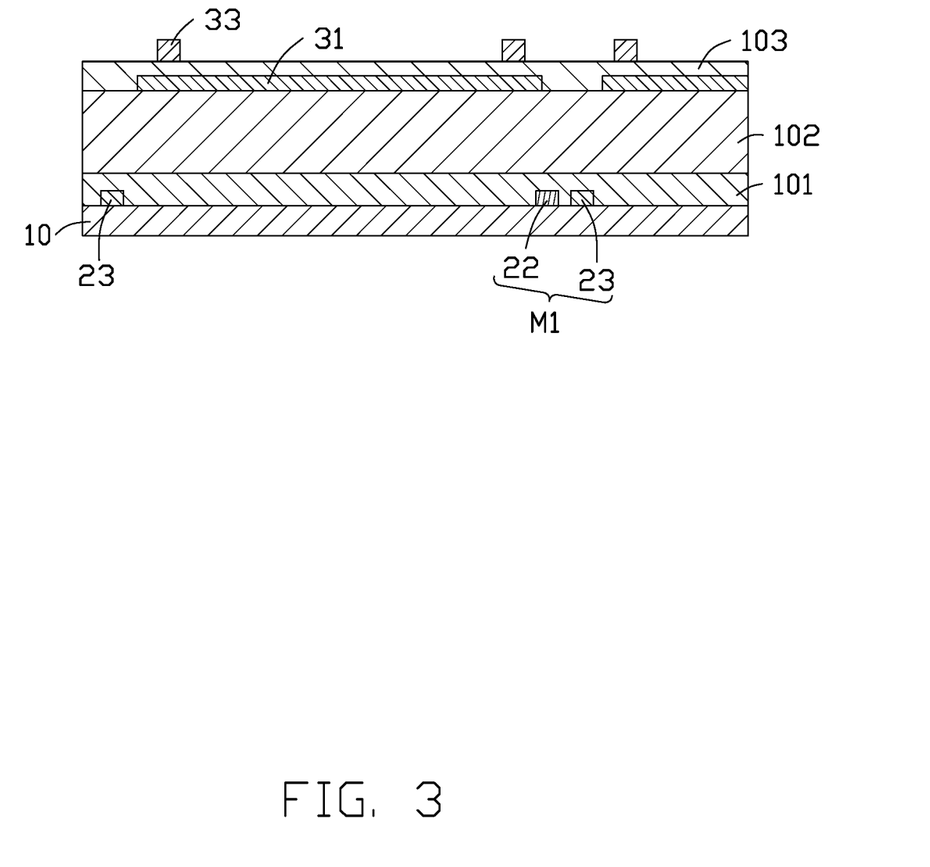
FIG. 3 is a cross-sectional view along line III-III of FIG. 2 according to a first embodiment.
Figure 4:
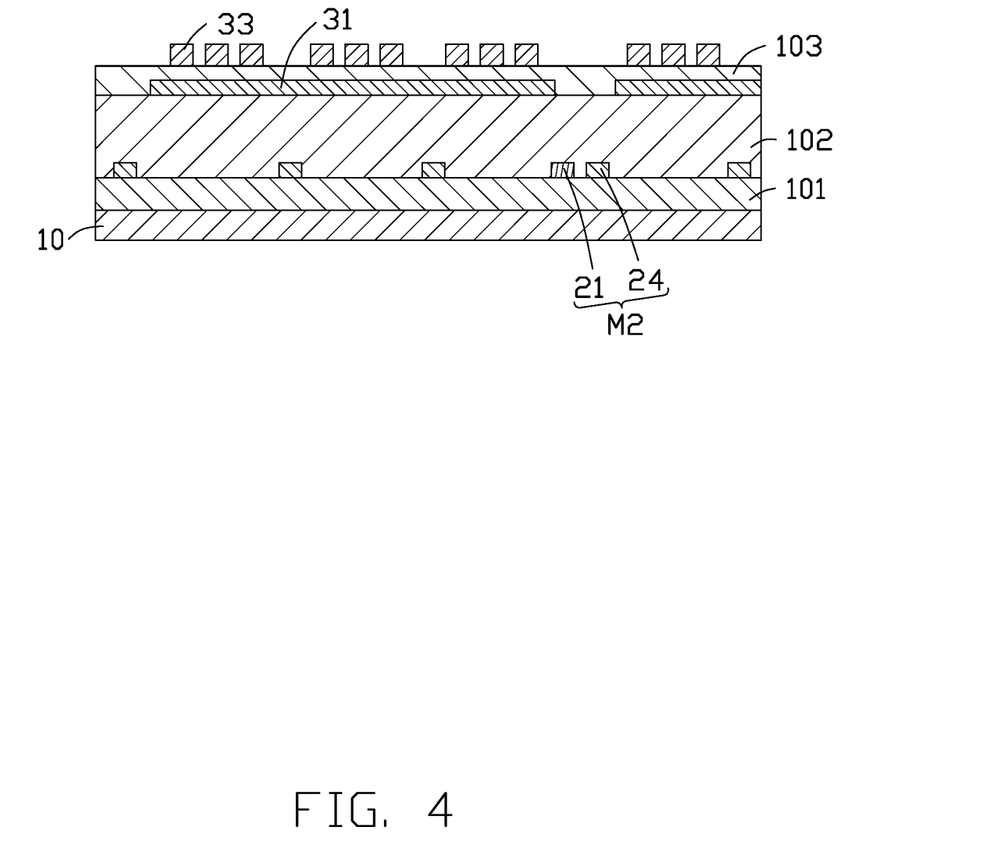
FIG. 4 is a cross-sectional view along line IV-IV of FIG. 2 according to the first embodiment.

As shown in FIGS. 3 and 4, the touch display panel 100 includes metal layers (M1 and M2) on the substrate 10. Depending on the distance from the substrate 10 and on the order of stacking on the substrate 10, the metal layer where the scan lines 23 and the touch scan lines 22 are located is defined as a first metal layer M1. The metal layer where the data lines 24 and the touch lines 21 are located is defined as a second metal layer M2. Insulation layers are arranged between different metal layers for electrical insulation.

As shown in FIGS. 3 and 4, in a first embodiment, the first metal layer M1 is on a surface of the substrate, and scan line 23 and touch scan line 22 are patterned in the first metal layer M1.

A first insulation layer 101 is on a side of first metal layer M1 away from the substrate 10 and completely covers the scan lines 23 and the touch scan lines 22. The second metal layer M2 is on a side of the first insulation layer 101 away from the substrate 10. The first insulation layer 101 is between the first metal layer M1 and the second metal layer M2 and electrically insulates the first metal layer M1 from the second metal layer M2. The data lines 24 and the touch lines 21 are patterned in the second metal layer M2.

A second insulation layer 102 is on a side of the first insulation layer 101 away from the substrate 10. The second insulation layer 102 completely covers the data lines 24 and the touch lines 21. The common electrodes 31 are on a side of the second insulation layer 102 away from the substrate 10. A third insulation layer 103 is on a side of the second insulation layer 102 away from the substrate 10. The third insulation layer 103 completely covers the common electrodes 31. The pixel electrodes 33 are on surface of the third insulation layer 103 away from the substrate 10. The third insulation layer 103 is between the common electrodes 31 and the pixel electrodes 33 to electrically insulate the common electrodes 31 from the pixel electrodes 33.

Vias (not shown) are defined in the insulation layers (e.g., 101, 102, and 103). That is, the pixel electrodes 33, the first TFTs 11, the scan lines 23 patterned in the first metal layer M1, and the data line 24 patterned in the second metal layer M2 are electrically connected by the vias in the first insulation layer 101, the second insulation layer 102, and the third insulation layer 103. The common electrodes 31, the second TFTs 12, the touch scan lines 22 1 patterned in the first metal layer M1, and the touch lines 21 patterned in the second metal layer M2 are electrically connected by the vias in the insulation layers.

Figure 5:
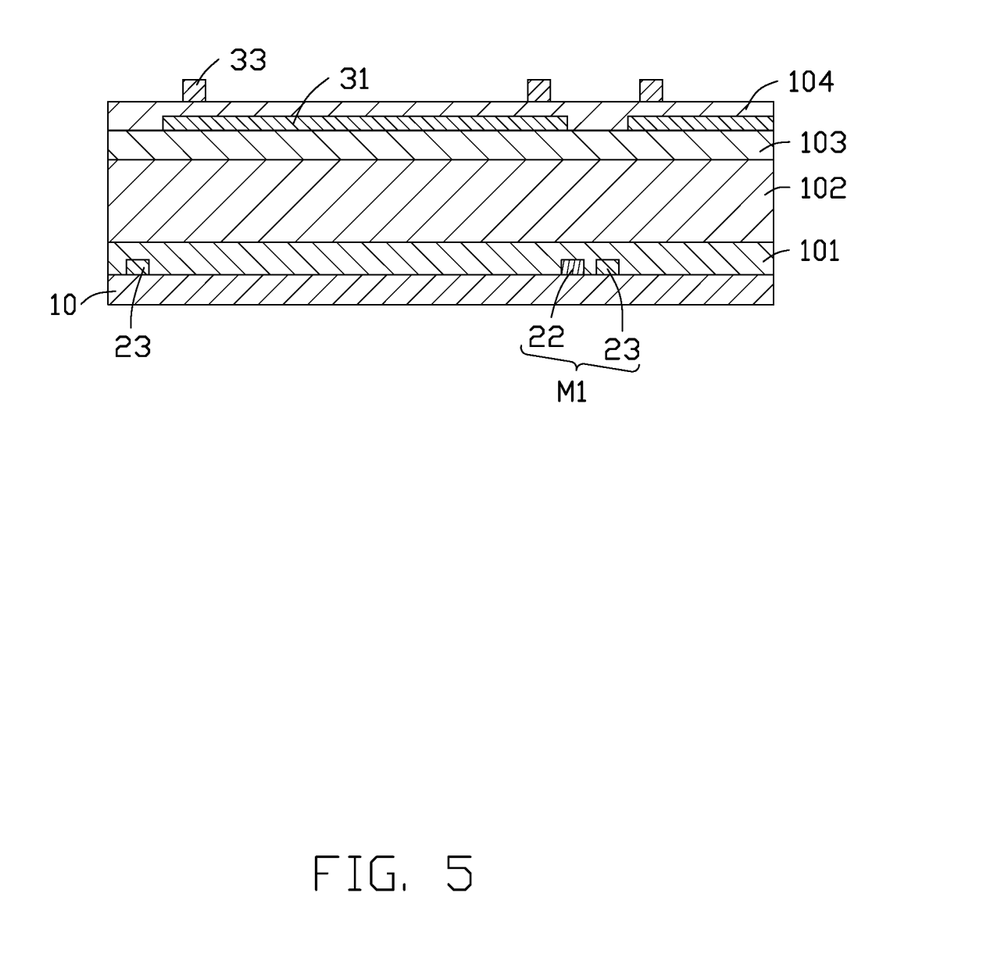
FIG. 5 is a cross-sectional view along line III-III of FIG. 2 according to a second embodiment.
Figure 6:
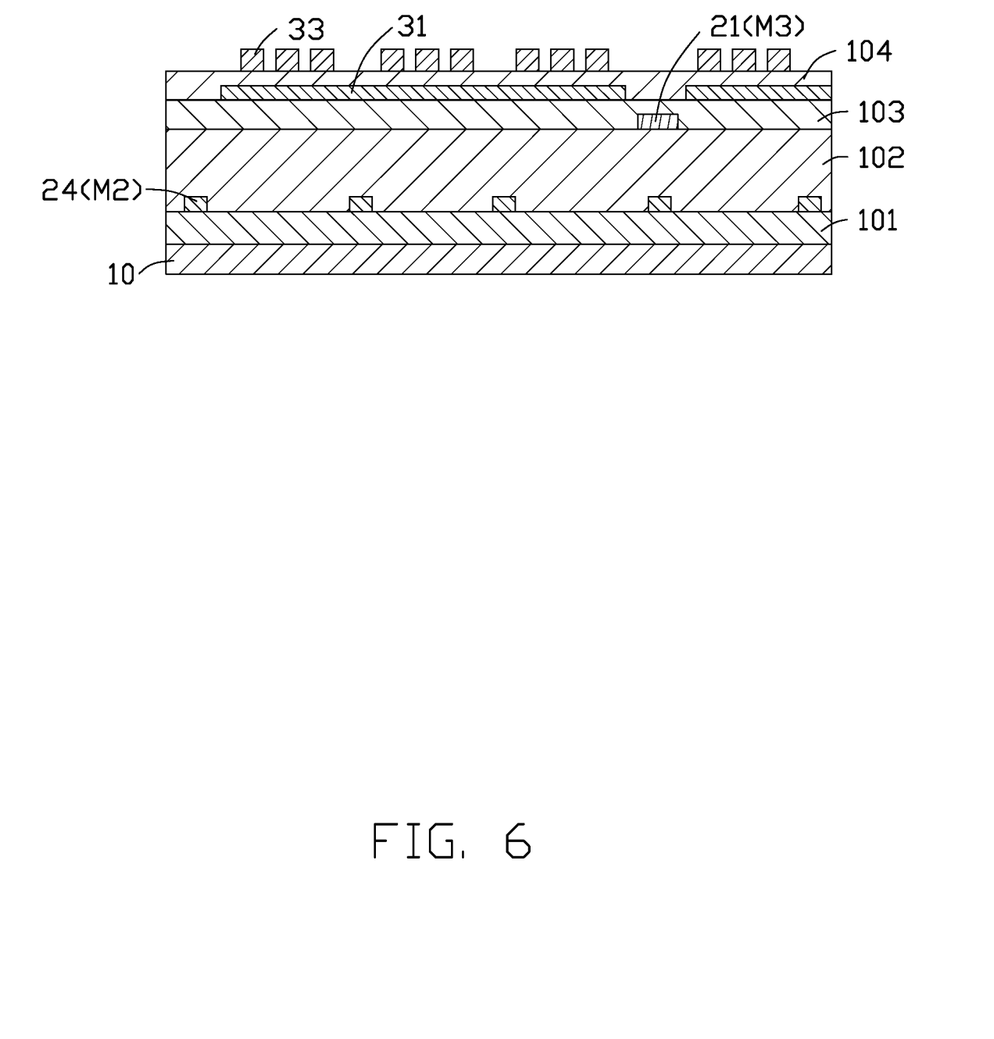
FIG. 6 is a cross-sectional view along line IV-IV of FIG. 2 according to the second embodiment.

As shown in FIGS. 5 and 6, in a second embodiment, the metal layer carrying the scan lines 23 and the touch scan lines 22 is defined as a first metal layer M1. The metal layer carrying the data lines 24 is defined as a second metal layer M2, and the metal layer carrying the touch lines 21 is defined as a third metal layer M3. That is, the data lines 24 and the touch lines 21 are in different metal layers.

A first insulation layer 101 is on a surface of first metal layer M1 away from the substrate 10. The first insulation layer 101 completely covers the scan lines 23 and the touch scan lines 22. A second metal layer M2 is on a surface of the first insulation layer 101 away from the substrate 10. The data lines 24 are patterned in the second metal layer M2. The first insulation layer 101 provides insulation between the first metal layer M1 and the second metal layer M2.

A second insulation layer 102 is on a surface of the first insulation layer 101 away from the substrate 10. The second insulation layer 102 completely covers the data lines 24. A third metal layer M3 is on a surface of the second insulation layer 102 away from the substrate 10. The touch lines 21 are patterned in the third metal layer M3. A third insulation layer 103 is on a surface of the second insulation layer 102 away from the substrate 10, and the third insulation layer 103 completely covers the touch lines 21. The common electrodes 31 are on a surface of the third insulation layer 103 away from the substrate 10. A fourth insulation layer 104 is on a surface of the third insulation layer 103 away from the substrate 10, and completely covers the common electrodes 31. The pixel electrodes 33 are on a surface of the fourth insulation layer 104 away from the substrate 10 and each pixel electrode 33 is spaced from its neighbor. The fourth insulation layer 104 is between the common electrodes 31 and the pixel electrodes 33 to electrically insulate the common electrodes 31 from the pixel electrodes 33.

Vias (not shown) are defined in the insulation layers (e.g., 101, 102, and 103). The touch scan lines 22, the scan lines 23, the second TFTs 12, and the common electrodes 31 are electrically connected through vias in the insulation layers. That is, the second TFTs 12 are electrically connected to the touch scan lines 22 patterned in the first metal layer M1 and the touch lines 21 patterned in the third metal layer M3 through vias in the insulation layers.

Figure 7:
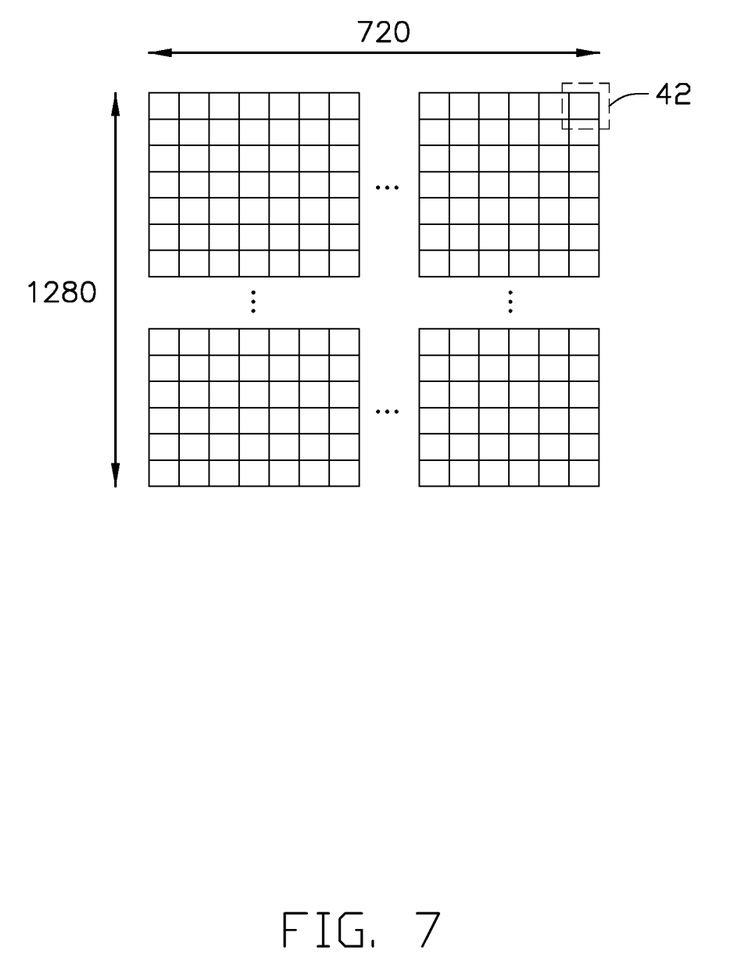
FIG. 7 is a diagrammatic view showing a touch display panel having a display resolution of 720*1280.
Figure 8:
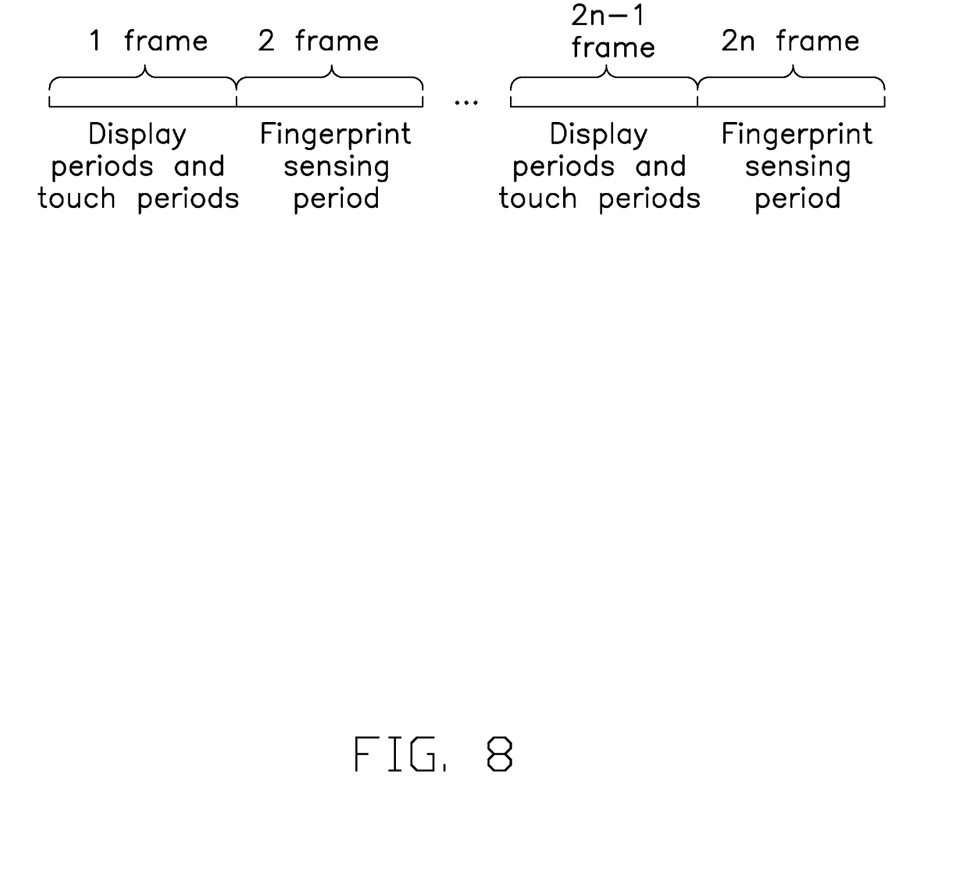
FIG. 8 is a diagrammatic view of a plurality of driving cycles of the touch display panel of FIG. 7.

As shown in FIG. 7, a touch display panel having a display resolution of 720*1280 is taken here as exemplary. As shown in FIG. 8, the touch display panel 100 includes alternating odd frames and even frames. Each odd frame includes display periods (DiPs) and touch periods (TuPs), and the DiPs and TuPs share the odd frame. Each even frame includes a fingerprint sensing period (FisP). The FisP is performed in frames before and after the frame containing the DiPs and TuPs.

In one embodiment, each odd frame includes the same number (e.g., 16) of DiPs and TuPs. In each odd frame, there is one TuP between each two DiPs, and there is one DiP between each two TuPs. In the first frame, the touch display panel 100 is driven to display images and sense touches in a time division manner. In the second frame, the touch display panel 100 is driven to sense fingerprint, in the third frame the touch display panel 100 is driven to display images and touch sensing in a time division manner, and in the fourth frame, the touch display panel 100 is driven to sense fingerprint. In the 2n−1 frame, the touch display panel 100 is driven to display images and sense touches in a time division manner, and in the 2n frame, the touch display panel 100 is driven to sense fingerprints (n is an integer greater than 1). As such, the touch display panel 100 achieves display, touch sensing, and fingerprint sensing.

Figure 9:
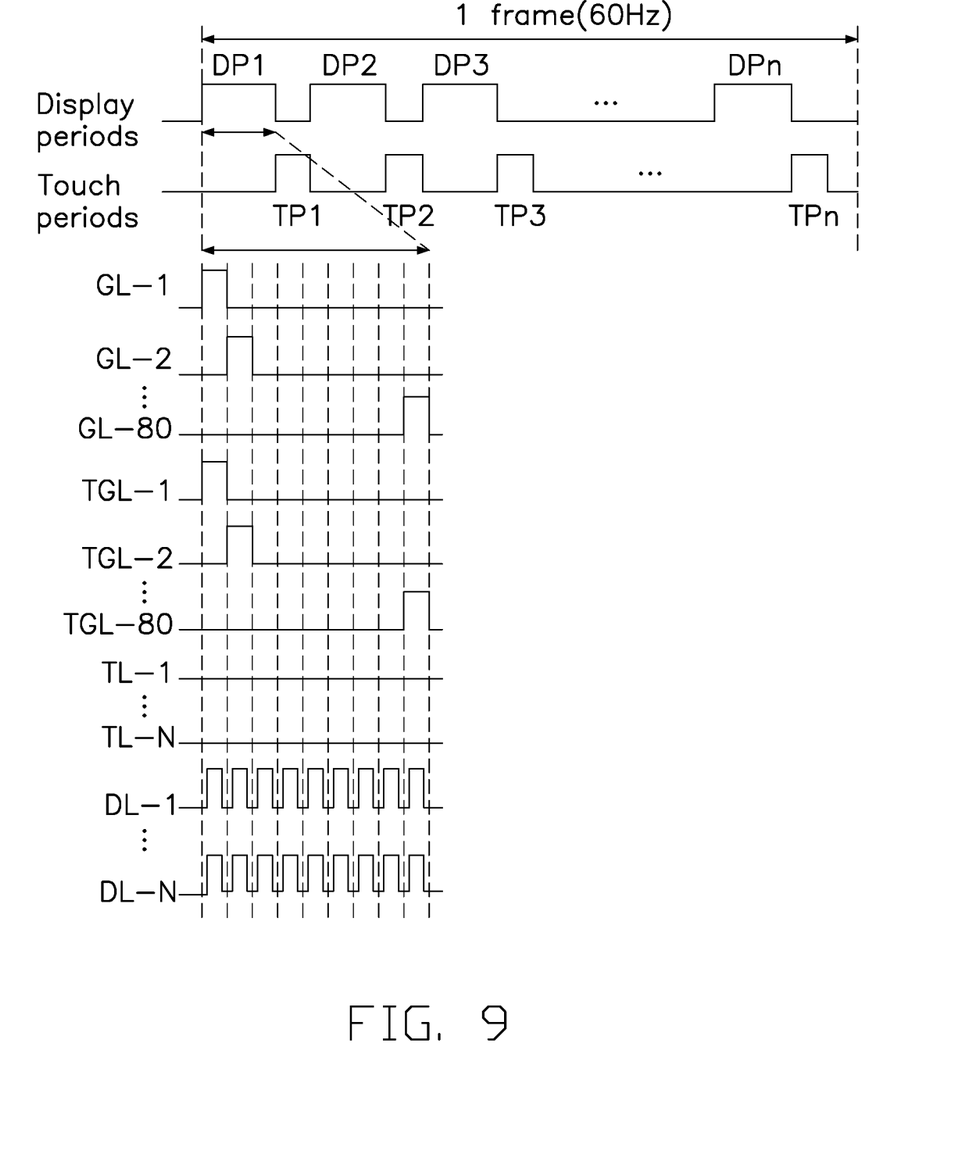
FIG. 9 is a timing chart showing waveforms in a display period of one driving cycle of FIG. 8.

As shown in FIG. 9, a display scanning frequency is 60 HZ, one frame includes alternating DiPs and TuPs, and n is the number of both DiPs and TuPs. During the first display period (DiP1), scan lines GL-1 to GL-80 receive scan signals in sequence, all the data lines DL-1 to DL-2160 receive a display signal (e.g., a square wave signal). Touch scan lines TGL-1 to TGL-80 receive scan signals in sequence, and all touch lines TL-1 to TL-720 receive a common voltage signal. Each of the first TFTs 11 is turned on or off under the control of the scan signal loaded by the scan line electrically connected thereto. When the first TFT to which the pixel electrode 33 is connected is turned on, the pixel electrode 33 receives the display signal. Each of the second TFTs 12 is turned on or off under the control of the scan signal loaded by the touch scan line electrically connected thereto. When the second TFT to which the common electrode 31 is connected is turned on, the common electrode 31 receives the common voltage signal. That is, all touch lines TL maintain the common voltage, and the data lines DL-1 to DL-2160 apply the display signal to the pixel electrodes 33. During the second display period (DiP2), scan signals are sequentially applied to scan lines GL-81 to GL-160, data lines DL-1 to DL-2160 receive the display signal (e.g., a square wave signal), and scan signals are sequentially applied to touch scan lines TGL-81 to TGL-160. Touch lines TL-1 to TL-720 maintain a common voltage signal (e.g., a low-level signal). When the first TFT to which the pixel electrode 33 is connected is turned on, the pixel electrode 33 receives the display signal. When the second TFT 12 to which the common electrode 31 is connected is turned on, the common electrode 31 receives the common voltage signal. Thereby the third display period (DiP3) to the nth display period (DiPn) are completed, thereby completing the full-screen scan to obtain a complete display image.

Figure 10:
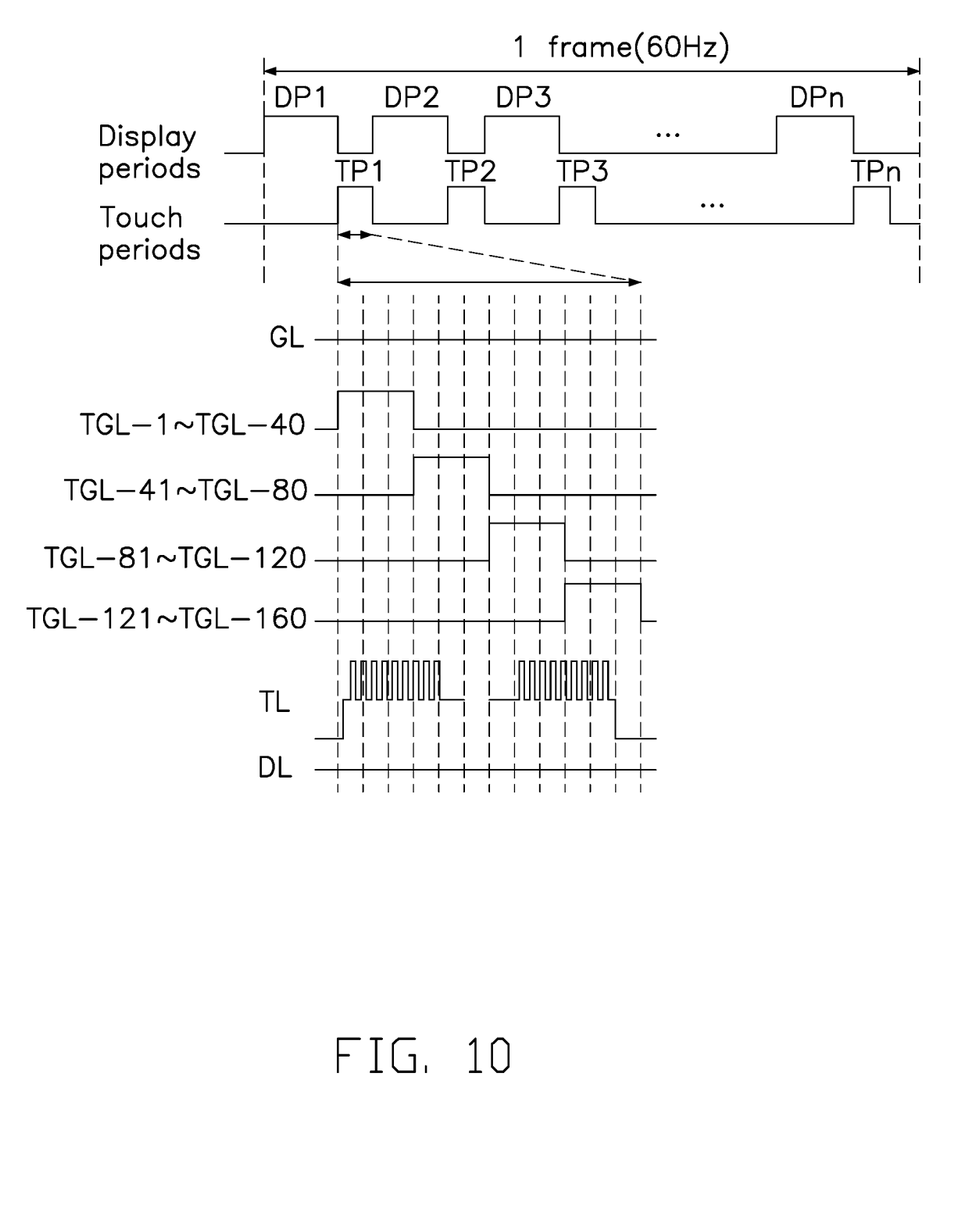
FIG. 10 is a timing chart showing waveforms in a touch period of one driving cycle of FIG. 8.

Referring to FIG. 10, during the first touch period (TuP1), adjacent three common electrodes 31 serve as one touch electrode, and touch sensing signals are applied to the touch electrodes through the touch lines 21 to achieve self-capacitance touch sensing.

In one embodiment, the display scanning frequency is 60 Hz and the touch scanning frequency is 120 Hz. During the first touch period (TuP1), the displayed image is not updated, and all the scan lines GL receive a low level signal. All data lines DL are grounded to float the pixel electrodes 33, touch scan lines TGL-1 to TGL-40 simultaneously receive scan signals, and all the touch lines TL receive signals to apply touch driving signals to the common electrodes 31 of the first to fortieth rows. Then, the application of the scan signal to the touch scan lines TGL-1 to TGL-40 is stopped. The touch scan lines TGL-41 to TGL-80 simultaneously receive scan signals, and touch lines TL-21 to TL-720 receive signals to apply touch driving signals to the common electrodes 31 of the 41st to 80th rows. And so on, until the common electrodes 31 of the 121st to the 160th rows are applied with touch driving signals.

During the second touch period (TuP2), touch driving signals are sequentially applied to the common electrodes 31 of the 161st row to the 320th row. After the touch driving signals are applied to the common electrodes 31 of the last row of the n/2th touch period (TuPn/2), the scanning is started from the first row of the common electrodes 31. Thereby, the touch scan (120 Hz) of each frame image (60 Hz) is performed twice in full screen mode.

Figure 11:
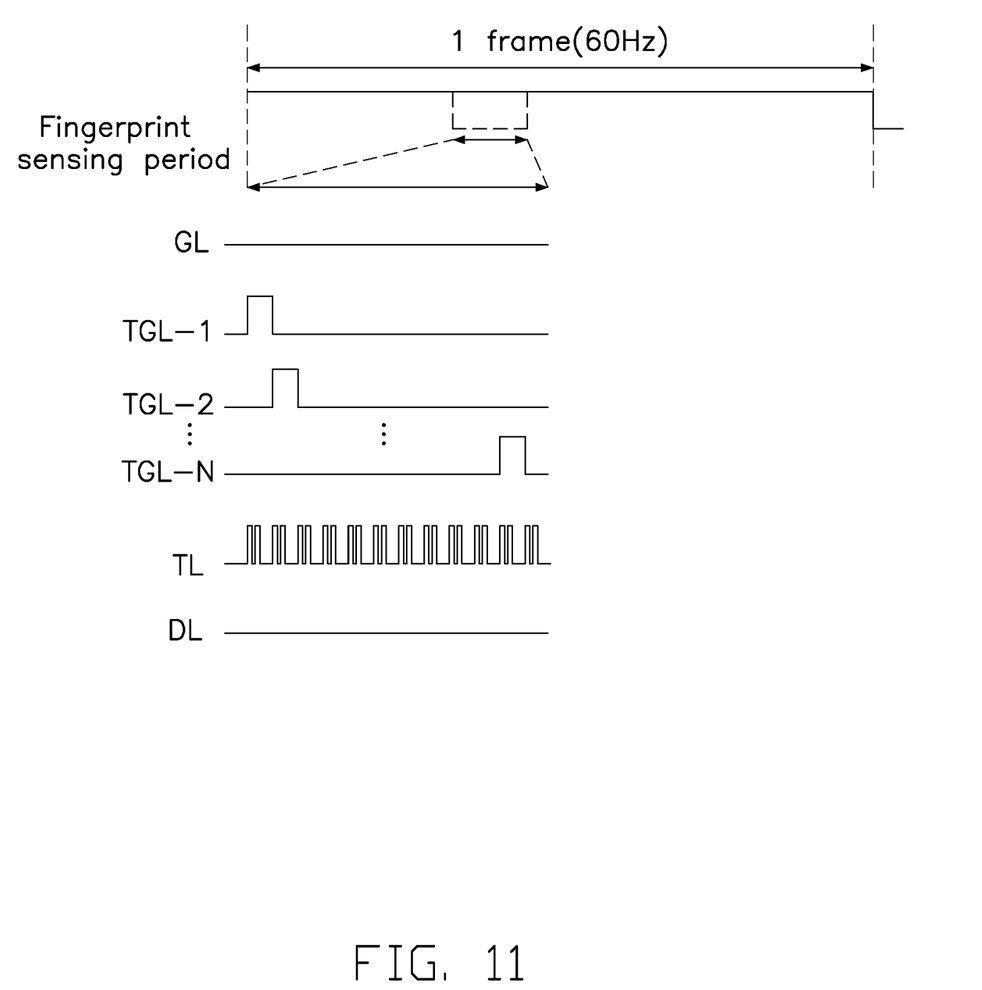
FIG. 11 is a timing chart showing waveforms in a fingerprint sensing period of one driving cycle of FIG. 8.

As shown in FIG. 11, during the FisP, each common electrode 31 serves as one fingerprint sensing electrode. The driving circuit 40 applies fingerprint sensing signals to the common electrodes 31 through the touch lines 21 to sense fingerprint.

During FisP, a complete frame image is required, the image display is not updated, the displayed image is not updated, and all scan lines GL-1 to GL-N receive a low-level signal. All data lines DL are grounded to float the pixel electrodes 33. Scan signals are applied to all touch scan lines TGL in sequence, fingerprint sensing signals are applied to all touch lines TL, and fingerprint sensing signals are applied from the common electrodes 31 in the first row. This continues as far as the common electrodes 31 in the 1280th row. After scanning is completed, a complete full-screen fingerprint image is obtained.

In addition, the display resolution, the touch resolution, the n number of DiPs and TuPs can each be adjusted according to different applications and needs.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A touch display panel comprising:
   a substrate;
   a plurality of scan lines on the substrate and extending in a first direction;
   a plurality of data lines on the substrate and extending in a second direction, the second direction intersecting with the first direction;
   a plurality of sub-pixels, each of the plurality of sub-pixels being defined by an area surrounded by any adjacent two of the scan lines and any adjacent two of the data lines insulatively intersecting with the adjacent two scan lines, and each of the plurality of sub-pixels comprising a pixel electrode and a first thin film transistor (TFT) electrically connected to the pixel electrode;
   a plurality of touch scan lines on the substrate and extending in the first direction;
   a plurality of touch lines on the substrate and extending in the second direction; and
   a plurality of sensing units, each of the plurality of sensing units being defined by an area surrounded by any adjacent two of the touch scan lines and any adjacent two of the touch lines insulatively intersecting with the adjacent two touch scan lines, each of the plurality of sensing units comprising a common electrode and a second TFT electrically connected to the common electrode;
   wherein:
   a gate electrode of the second TFT is electrically connected to one of the plurality of touch scan lines, and a source electrode of the second TFT is electrically connected to one of the plurality of touch lines, and a drain electrode of the second TFT is electrically connected to the common electrode of one of the plurality of sensing units;
   each of the plurality of touch lines is configured to load a common voltage signal, a touch driving signal, and a fingerprint sensing signal;
   each of the plurality of touch scan lines is configured to turn on and turn off the second TFT in a time division manner so that the common voltage signal, the touch driving signal, or the fingerprint sensing signal from one of the plurality of touch lines is input to the common electrode of one of the plurality of sensing units.

2. The touch display panel according to claim 1, wherein display frequency of the touch display panel comprises a plurality of driving cycles, each of the plurality of driving cycles comprises a display period, a touch period, and a fingerprint sensing period;

during the display period, the common electrode of each of the plurality of sensing units receives the common voltage signal to display images;

during the touch period, the common electrodes of each of the plurality of sensing units receives the touch driving signal to sense touches; and during the fingerprint sensing period, the common electrodes of each of the plurality of sensing units receives the fingerprint sensing signal to sense fingerprint.

3. The touch display panel according to claim 2, wherein each of the plurality of driving cycles comprises an odd frame and an even frame, the odd frame comprises alternating the display period and the touch period, the even frame comprises the fingerprint sensing period.

4. The touch display panel according to claim 2, wherein during the fingerprint sensing period, all of the plurality of scan lines receive a low level signal, all of the plurality of data lines are grounded, the pixel electrode of each of the plurality of sub-pixels is floated, the plurality of touch scan lines receives a scan signal in sequence, and all of the plurality of touch lines receive the fingerprint sensing signal to achieve fingerprint sensing.

5. The touch display panel according to claim 1, wherein in each of the plurality of sub-pixels, a gate electrode of the first TFT is electrically connected to one of the plurality of scan lines, and a source electrode of the first TFT is electrically connected to one of the plurality of data lines, a drain electrode of the first TFT is electrically connected to the pixel electrode, and the first TFT is configured to load a display signal to the pixel electrode through one of the plurality of data lines under a control of one of the plurality of scan lines.

6. The touch display panel according to claim 1, wherein:
the plurality of scan lines and the plurality of touch scan lines are defined by a first metal layer;
the plurality of the touch lines and the plurality of data lines are defined by a second metal layer; and
the first metal layer and the second metal layer are different layers.

7. The touch display panel according to claim 1, wherein:
the plurality of scan lines and the plurality of the touch scan lines are defined by a first metal layer;
the plurality of data lines is defined by a second metal layer;
the plurality of touch lines is defined by a third metal layer;
the first metal layer, the second metal layer, and the third metal layer are different layers.

8. The touch display panel according to claim 1, wherein at least three adjacent sub-pixels of the plurality of sub-pixels define one pixel, and a projection of one common electrode on the substrate covers projections of all of the pixel electrodes in at least one pixel on the substrate.

9. The touch display panel according to claim 8, wherein the common electrode of each of the plurality of sensing units is substantially rectangular, and a maximum side length of the rectangle is less than 100 micrometers.

10. A touch display panel comprising:
a substrate;
a plurality of scan lines on the substrate and extending in a first direction;
a plurality of data lines on the substrate and extending in a second direction, the second direction intersecting with the first direction;
a plurality of sub-pixels, each of the plurality of sub-pixels being defined by an area surrounded by any adjacent two of the scan lines and any adjacent two of the data lines insulatively intersecting with the adjacent two scan lines, and each of the plurality of sub-pixels comprising a pixel electrode and a first thin film transistor (TFT), a gate electrode of the first TFT is electrically connected to one of the plurality of scan lines, and a source electrode of the first TFT is electrically connected to one of the plurality of data lines, a drain electrode of the first TFT is electrically connected to the pixel electrode, and the first TFT is configured to load a display signal to the pixel electrode through one of the plurality of data lines under a control of one of the plurality of scan lines;
a plurality of touch scan lines on the substrate and extending in the first direction;
a plurality of touch lines on the substrate and extending in the second direction;
a plurality of sensing units, each of the plurality of sensing units being defined by an area surrounded by any adjacent two of the touch scan lines and any adjacent two of the touch lines insulatively intersecting with the adjacent two touch scan lines, each of the plurality of sensing units comprising a common electrode and a second TFT electrically connected to the common electrode; and
a driving circuit electrically connected to the plurality of scan lines, the plurality of data lines, the plurality of touch scan lines, and the plurality of touch lines; wherein:
during a display period, the driving circuit applies a common voltage signal to the common electrode of each of the plurality of sensing units, and applies a display signal to the pixel electrode of each of the plurality of sub-pixels to display images;
during a touch period, the driving circuit applies a touch driving signal to the common electrode of each of the plurality of sensing units to sense touches;
during a fingerprint sensing period, the driving circuit applies a fingerprint sensing signal to the common electrode of each of the plurality of sensing units to sense fingerprint.

11. The touch display panel according to claim 10, wherein the touch display panel comprises alternating odd frames and even frames, each of the odd frames comprises alternating the display period and the touch period, each of the even frames comprises the fingerprint sensing period.

12. The touch display panel according to claim 10, wherein during the fingerprint sensing period, all of the plurality of scan lines receive a low level signal, all of the plurality of data lines are grounded, the pixel electrode of each of the plurality of sub-pixels is floated, the plurality of touch scan lines receives a scan signal in sequence, and all of the plurality of touch lines receive the fingerprint sensing signal to sense fingerprint.

13. The touch display panel according to claim 10, wherein:
the plurality of scan lines and the plurality of touch scan lines are defined by a first metal layer;
the plurality of the touch lines and the plurality of data lines are defined by a second metal layer; and
the first metal layer and the second metal layer are different layers.

14. The touch display panel according to claim 10, wherein:

the plurality of scan lines and the plurality of the touch scan lines are defined by a first metal layer;

the plurality of data lines is defined by a second metal layer;

the plurality of touch lines is defined by a third metal layer;

the first metal layer, the second metal layer, and the third metal layer are different layers.

15. The touch display panel according to claim 10, wherein at least three adjacent sub-pixels of the plurality of sub-pixels define one pixel, and a projection of one common electrode on the substrate covers projections of all of the pixel electrodes in at least one pixel on the substrate.

16. The touch display panel according to claim 15, the common electrode of each of the plurality of sensing units is substantially rectangular, and a maximum side length of the rectangle is less than 100 micrometers.

17. A method for driving a touch display panel, wherein the touch display panel defines a plurality of sub-pixels, each of the sub-pixels comprises one pixel electrode, and at least three adjacent sub-pixels of the plurality of sub-pixels define one pixel;

the touch display panel further comprises a plurality of common electrodes, each of the plurality of common electrodes covers all of the pixel electrodes in the at least one pixel;

the touch display panel comprises alternating odd and even frames, each of the odd frames comprises alternating a display period and a touch period, each of the even frames comprises a fingerprint sensing period; wherein:

the driving method of the touch display panel comprises:

applying a common voltage signal to the plurality of common electrodes during the display period, and applying a display signal to the pixel electrode of the plurality of sub-pixels to display images;

applying a touch driving signal to the plurality of common electrodes during the touch period to sense touches; and applying a fingerprint sensing signal to the plurality of the common electrodes during the fingerprint sensing period to sense fingerprint.

18. The method for driving the touch display panel according to claim 17, wherein during the fingerprint sensing period, applying a low level signal to all of the plurality of scan lines, grounding all of the plurality of data lines, floating the pixel electrode of each of the plurality of sub-pixels, applying a scan signal in sequence to the plurality of touch scan lines, and applying the fingerprint sensing signal to all of the plurality of touch lines.

* * * * *